United States Patent [19]

Bender

[11] Patent Number: 5,028,070
[45] Date of Patent: Jul. 2, 1991

[54] GAS GENERATOR FOR AN AIRBAG WITH A PROTECTIVE COVER

[75] Inventor: Richard Bender, Lauf, Fed. Rep. of Germany

[73] Assignee: Dynamit Nobel A.G., Troisdorf, Fed. Rep. of Germany

[21] Appl. No.: 497,420

[22] Filed: Mar. 22, 1990

[30] Foreign Application Priority Data

Mar. 25, 1989 [DE] Fed. Rep. of Germany ....... 3909841

[51] Int. Cl.$^5$ ............................................. B60R 21/26
[52] U.S. Cl. .................................... 280/741; 280/742
[58] Field of Search ................ 280/741, 742, 736, 728

[56] References Cited

U.S. PATENT DOCUMENTS 4,200,615 4/1980 Hamilton et al. ................... 280/741

Primary Examiner—Kenneth R. Rice
Attorney, Agent, or Firm—Antonelli, Terry, Stout & Kraus

[57] ABSTRACT

By providing a cover of heat-resistant fabric over a pressure tank of a gas generator for an airbag, the objective can be attained that the outer exposed surface of the covered gas generator is not heated up to an excessive degree. Moreover, due to this feature, the proportion of solid and liquid, hot particles in the gaseous streams discharged from the gas generator can be additionally reduced.

9 Claims, 1 Drawing Sheet

GAS GENERATOR FOR AN AIRBAG WITH A PROTECTIVE COVER

BACKGROUND OF THE INVENTION

This invention relates to a gas generator for producing gas to inflate an airbag of a vehicle with at least one pressure tank filled with gas-releasing materials, the wall of this pressure tank exhibiting gas discharge openings.

Such a gas generator has been described, by way of example, in DE No. 3,742,656-A1 and corresponding U.S. Pat. application Ser. No. 07/197,272, filed May 23, 1988. This generator consists of a central member to which are radially attached at least two tubular pressure tanks. The pressure tanks are extensively filled with a propellant which, after ignition, produces large amounts of gas within a short period of time exiting through discharge openings in the jacket surface of each pressure tank, and thereby inflating an airbag. Filters are arranged in front of the discharge openings in the wall of the pressure tank; these filters are to retain hot (solid and liquid) particles formed during the reaction. On account of the reaction in the pressure tank, the wall of the pressure tank is likewise heated up whereby a collapsing airbag can be superficially melted and thereby can be damaged. Also, the danger cannot be excluded that the vehicle occupant receives injuries from the hot surface of the gas generator.

SUMMARY OF THE INVENTION

The invention is based on the object of improving the gas generator for an airbag in such a way that its surface after initiation of gas generation does not become too hot, for example, it does not exceed 70° C.

This object has been attained by with gas generator of the type heretofore described by providing that at least the pressure tank (or tanks) is surrounded by a heat-resistant fabric.

The heat-resistant fabric reliably prevents the temperature of the outer surface of the gas generator of this invention from exceeding 70° C. The heat-resistant fabric, with adequate gas permeability, must exhibit minimum strength in that it also takes over simultaneously an additional filter function. In spite of a filter insert, conventional gas generators often do not entirely prevent slag particles from being likewise ejected together with the gas. On account of the heat-resistant fabric, the proportion of solid and liquid, hot particles in the gaseous stream can be still further reduced to a considerable extent. It has been found in certain cases that the filtering action of the heat-resistant fabric is so good that the wire mesh filters within the tubular pressure tank can be made of a smaller size; an energy loss incurred while the gas passes through the heat-resistant fabric is negligible.

According to this invention, the at least one pressure tank is to be enveloped by a heat-resistant fabric. Therefore, on account of the mostly cylindrical configuration, a heat-resistant fabric in the shape of a tube is especially preferred. This tube can be inverted over the cylindrical pressure tank(s) and can be mounted in a simple way by means of a clamping ring. Insofar as possible, it is especially preferred to surround the entire gas generator with a heat-resistant fabric. Since a gas generator frequently has an elongated shape, covering with a hose-like, heat-resistant fabric is possible in most instances. It is sufficient for this purpose to cut a tube corresponding to the total length of the gas generator in a cross-wise pattern so that it can be pulled thereover, and no additional fastening is required.

The heat-resistant fabric is preferably made up of glass fibers and/or ceramic fibers; also a reinforcement with metallic wires is possible.

The heat-resistant fabric is exposed to considerable stresses during inflation of the airbag; for this reason, it is advantageous to surround the heat-resistant fabric with an additional supporting skeleton, for example a wire frame. If the strength of the filter fabric is primarily provided by such a supporting structure, then the strength of the heat-resistant fabric proper is less important, and in such a case it is possible, for example, also to utilize a nonwoven material, again preferably made of glass fibers or ceramic fibers.

Finally the heat-resistant fabric can also be fastened onto a carrier frame.

Especially preferred is a combination of a carrier frame with a supporting skeleton, the heat-resistant fabric being retained in sandwich fashion between the frame and the skeleton. A portion of the desired bulkiness of the heat-resistant fabric can be brought about by an undulated surface of the carrier frame; the effective thickness of the heat-resistant fabric can be up to 5 mm; 0.5–1.5 mm is preferred.

BRIEF DESCRIPTION OF THE DRAWINGS

The invention is illustrated by way of example in the accompanying drawing and is described in greater detail hereinafter.

In the drawing.

DETAILED DESCRIPTION OF THE INVENTION

Figure 1:
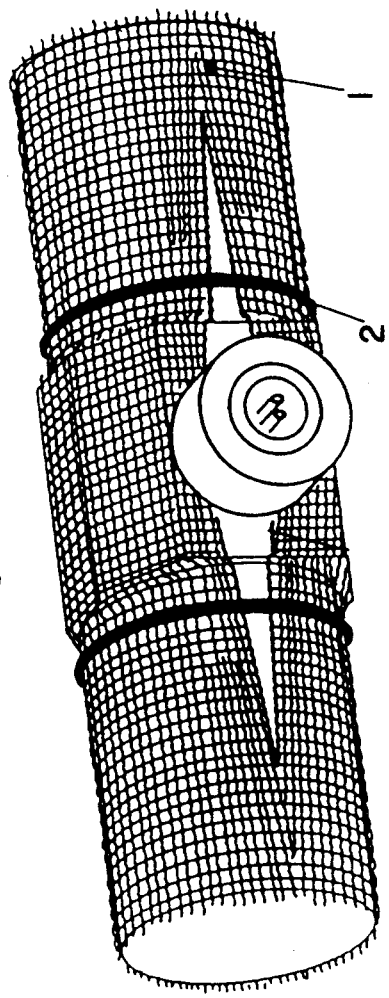
FIG. 1 shows a gas generator with a heat-resistant fabric tube inverted thereover.

In a gas generator as described in DE No. 3,742,656-A1, two mutually opposite tubular pressure tanks are attached to a central member. The gas generator is shown in FIG. 1. The jackets of these tanks are provided with apertures which are not shown. Although a filter unit is disposed around the column of pellets in the interior of the pressure tank, liquid and solid hot particles may still enter the airbag through the apertures in the cylindrical jacket wall of the pressure tank. Another troublesome effect resides in the heat generated during combustion of the gas-producing materials; the surface of the pressure tanks is heated up during this operation to above 100° C. In accordance with one embodiment of the invention (as shown in FIG. 1), the entire gas generator is here enveloped by a woven glass fiber hose 1. The hose is attached on both sides to the cylindrical pressure tanks by means of clamping rings 2. The hose is not in close contact with the tubular pressure tanks. The outer diameter of the hose is larger by up to 10 mm than the outer diameter of the tubular pressure tanks. If only hose 1 is to be utilized for a double-tube generator, then the hose will be cut open in a crosswise fashion in the middle at the central member. The hose should project on each side by up to 10 mm past an end of a tubular pressure tank.

Figure 3:
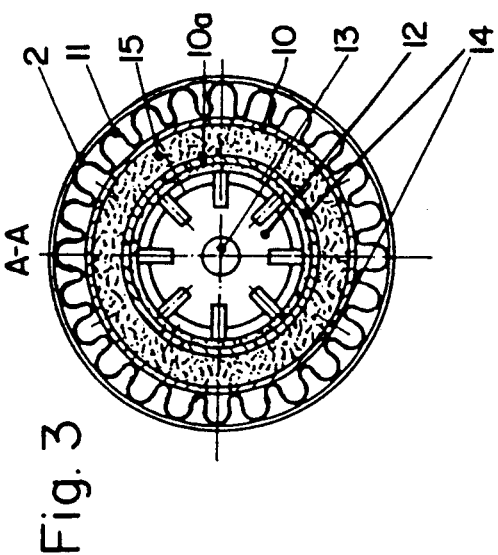
FIG. 3 is a section A—A through a gas generator according to FIG. 2.
Figure 2:
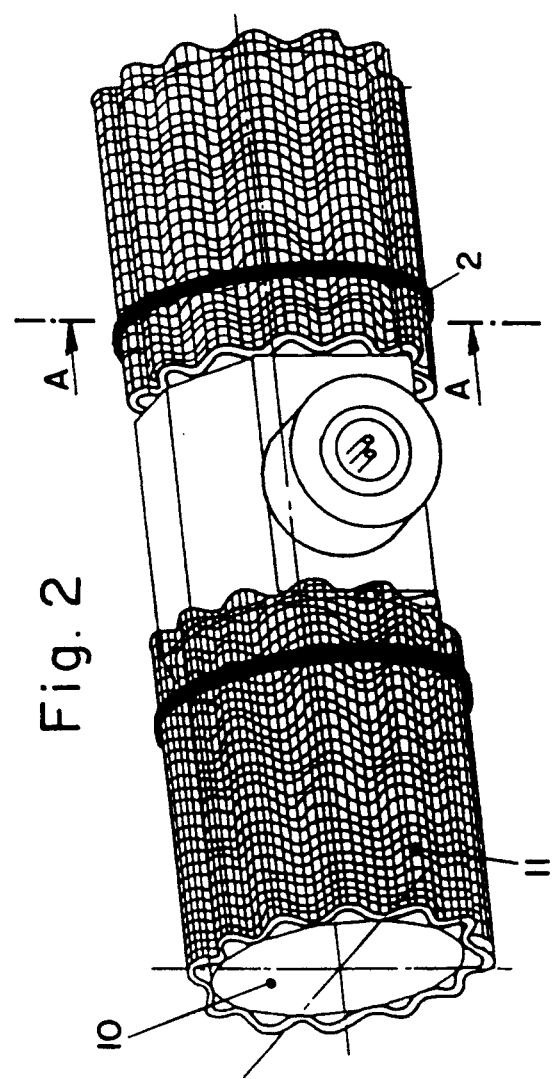
FIG. 2 is a gas generator wherein a heat-resistant fabric is pulled in a sandwich arrangement over the tubular pressure tanks.

In FIG. 2, only the two cylindrical pressure tanks 10 are encased by a corrugated heat-resistant fabric 11 lined in sandwich fashion and held by clamping rings 2, as can be seen even more clearly from the sectional view shown in FIG. 3. It can be seen from FIG. 3 that the gas-releasing materials in the form of annular molded elements 12 are stacked within a concentric inner tube 10a exhibiting, just as the jacket of the "outer" cylindrical pressure tank 10, gas discharge openings 14 in its surface. Ignition of the molding 12 from the central member takes place by way of the central duct 13 formed by the moldings 12. The space between the inner tube 10a and the outer pressure tank 10 is filled with wire mesh 15 acting as a filter. The heat-resistant fabric 11, installed in wavy fashion, retains as a second filter layer, hot particles that may have still been entrained and reduces the surface temperature of the gas generator.

Figure 3A:
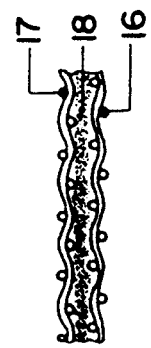
FIG. 3a shows a detail of the heat-resistant fabric in the sandwich arrangement according to FIG. 2.

FIG. 3a illustrates a specific embodiment of a heat-resistant fabric 11 made, for example, of glass fibers. In this case, a heat-resistant nonwoven material 18 is utilized instead of a loosely woven fabric of heat-resistant threads. The forces acting on the filter during gas generation are absorbed by a carrier frame 16 and a supporting skeleton 17 of metallic carriers.

What is claimed is:

1. A gas generator for an airbag comprising at least one pressure tank filled with combustible gas-releasing materials, a wall of said tank having gas discharge openings therein, and the at least one pressure tank being surrounded by means for preventing outer surfaces of the gas generator from reaching temperatures exceeding 70° C. during combustion of said gas-releasing materials, said means comprising a heat-resistant fabric permeable to the flow of gas discharged from the at least one pressure tank via said openings.

2. A gas generator according to claim 1, wherein said gas generator further includes a central member for effecting ignition of the combustible gas-releasing materials to which the at least one pressure tank is connected, said central member and said at least one pressure tank being surrounded by the heat-resistant fabric.

3. A gas generator according to claim 1, wherein the heat-resistant fabric consists predominantly of glass fibers or ceramic fibers.

4. A gas generator according to claim 1, 2 or 3, wherein the heat-resistant fabric is provided in the shape of a tube and said at least one pressure tank is in the shape of a cylinder.

5. A gas generator according to claim 4 wherein the heat-resistant fabric is surrounded by a supporting skeleton made of metal.

6. A gas generator according to claim 5, wherein a carrier frame is provided for the heat-resistant fabric.

7. A gas generator according to claim 1, wherein a carrier frame is provided for the heat-resistant fabric.

8. A gas generator according to claim 1, wherein the gas discharge openings in said at least one pressure tank are covered by said heat-resistant fabric so that gas discharged via said openings is filtered by the fabric.

9. A gas generator according to claim 2, wherein the gas discharge openings in said at least one pressure tank are covered by said heat-resistant fabric so that gas discharged via said openings is filtered by the fabric.

* * * * *